United States Patent [19]

Gotou et al.

[11] Patent Number: 4,804,278
[45] Date of Patent: Feb. 14, 1989

[54] KEY INPUT APPARATUS PROVIDED WITH A KEY INPUT BUFFER

[75] Inventors: Hidemi Gotou, Kawasaki; Shinichi Kimura, Tokyo, both of Japan

[73] Assignee: Canon Kabushiki Kaisha, Tokyo, Japan

[21] Appl. No.: 67,393

[22] Filed: Jun. 26, 1987

Related U.S. Application Data

[63] Continuation of Ser. No. 748,317, Jun. 24, 1985, abandoned.

[30] Foreign Application Priority Data

Jul. 3, 1984 [JP] Japan .................. 59-138262

[51] Int. Cl.⁴ .......................... B41J 29/38
[52] U.S. Cl. ....................... 400/54; 400/62; 400/83; 400/368; 400/369
[58] Field of Search .......... 400/50, 51, 52, 54, 400/62, 83, 368, 369

[56] References Cited

U.S. PATENT DOCUMENTS

| | | | |
|---|---|---|---|
| 3,292,764 | 12/1966 | Midgette et al. | 400/50 X |
| 3,354,372 | 11/1967 | Beasley | 400/54 X |
| 3,470,539 | 9/1969 | Proud, Jr. et al. | 400/50 X |
| 3,753,004 | 8/1973 | Dominic | 400/54 X |
| 3,924,722 | 12/1975 | Wienhold | 400/52 X |
| 4,087,852 | 5/1978 | Campbell et al. | 400/52 X |
| 4,244,031 | 1/1981 | Izushima et al. | 400/83 X |
| 4,323,888 | 4/1982 | Cole | 400/368 X |
| 4,375,922 | 3/1983 | Maegawa et al. | 400/368 X |
| 4,389,641 | 6/1983 | Nakanishi et al. | 400/83 X |
| 4,408,302 | 10/1983 | Fessel et al. | 400/83 X |
| 4,416,558 | 11/1983 | McInroy et al. | 400/83 X |
| 4,462,708 | 7/1984 | Luartes et al. | 400/52 X |
| 4,490,055 | 12/1984 | Johnson et al. | 400/51 |

FOREIGN PATENT DOCUMENTS

57-127236 8/1982 Japan .
1403630 8/1975 United Kingdom ............. 400/50

*Primary Examiner*—Ernest T. Wright, Jr.
*Attorney, Agent, or Firm*—Fitzpatrick, Cella, Harper & Scinto

[57] ABSTRACT

Input apparatus including: an input device for inputting a plurality of information codes; buffer apparatus for storing the plurality of information codes input from the input device, and control apparatus for sequentially executing processing in accordance with the plurality of information codes stored in the buffer apparatus and, in response to the temination of continuous input from the input device, for detecting that all of the unprocessed information codes stored in the buffer apparatus are the same, and for clearing the unexecuted information codes stored in the buffer apparatus upon such detection, such that sequential processing of the information codes is inhibited.

16 Claims, 1 Drawing Sheet

FLOWCHART 1

FLOWCHART 2

KEY INPUT APPARATUS PROVIDED WITH A KEY INPUT BUFFER

This application is a continuation of application Ser. No. 748,317, filed June 24, 1985, now abandoned.

BACKGROUND OF THE INVENTION

1. Field of the Invention

The present invention relates to an electronic apparatus provided with a key input control device.

2. Description of the Prior Art

On the conventional apparatuses of this type, there is known in the art a key input device provided with a key input buffer capable of storing a plurality of key information codes. With such a key input device, if one or more keys are held depressed continuously, the key input information code corresponding to the depressed key(s) is repeatedly and sequentially stored in the key input buffer, and thereafter the apparatus performs sequentially in the order of the stored codes certain processings suitable for the key information codes. Sequential processings are thus effected in such an apparatus by continuously depressing keys. However, when such continuously depressed keys are released while any stored key information codes still remain in the key buffer without being processed at that time, the above sequential processings suitable for the stored key information codes continue even after the keys are released. Thus, there arises a problem that correspondence in time between the key input and its processing cannot be obtained.

SUMMARY OF THE INVENTION

It is an object of the present invention to provide a key input control device for a key input apparatus of the type provided with a key input buffer capable of storing a plurality of key information codes. In the key input apparatus, when one or more keys are held depressed continuously, the key information code corresponding to the depressed key(s) is repeatedly and sequentially stored at certain time intervals in the key input buffer, and processings suitable for the key input information codes are made in the order of the stored codes in the input buffer. However, the key input control device invaldiates the input processings for the stored key information codes in the key input buffer when the continuously depressed keys are released.

Another object of the present invention is to provide an apparatus which can obtain a precise processing with proper correspondence between the end of an input operation and the end of its processing.

It is a further object of the present invention to provide an input apparatus which terminates excessive processings by clearing the input buffer when no inputs are received from the input section.

It is still another object of the present invention to provide an electronic typewriter capable of inhibiting character processings exceeding the necessary number of outputs by clearing the buffer when continuous character data input is terminated.

It is another object of the present invention to provide an input apparatus which clears stored key codes obtained through a continuous key depression upon release of the continuous key depression.

DETAILED DESCRIPTION OF THE PREFERRED EMBODIMENTS

The present invention will now be described in detail with reference to the accompanying drawings showing a preferred embodiment of the invention.

Figure 1:
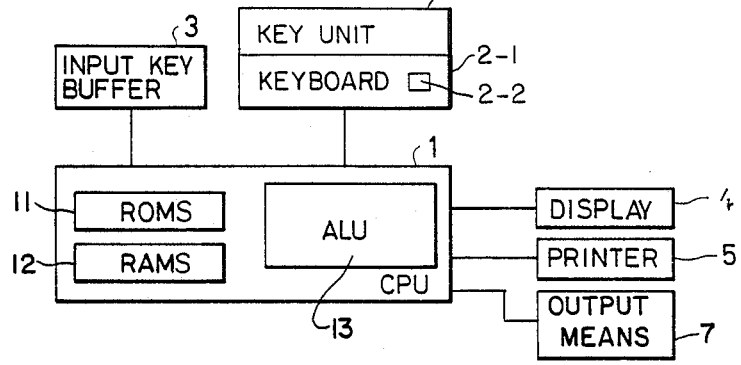
FIG. 1 is a block diagram showing the overall arrangement of an embodiment according to the present invention.

FIG. 1 is a block diagram showing the overall arrangement of an input apparatus according to the embodiment. In the figure, a central processing unit CPU 1 connects with an input key unit 2, such as a keyboard 2-1 having a plurality of keys a representative one of which is designated by numeral 2-2, a key input buffer designated by numeral 3, a liquid crystal display designated by numeral 4, and a printer designated by numeral 5.

Under control of the CPU 1, key information codes inputted from the input key unit 2 are sequentially stored in the key input buffer 3, capable of storing a plurality of key information codes at certain time intervals. Then, the information codes stored in the key input buffer 3 are read out in the order starting with the first stored code to effect processings suitable for the read-out codes. The results of the processing are in turn displayed on the liquid crystal display 4 or printed out on the printer 5.

Figure 2:
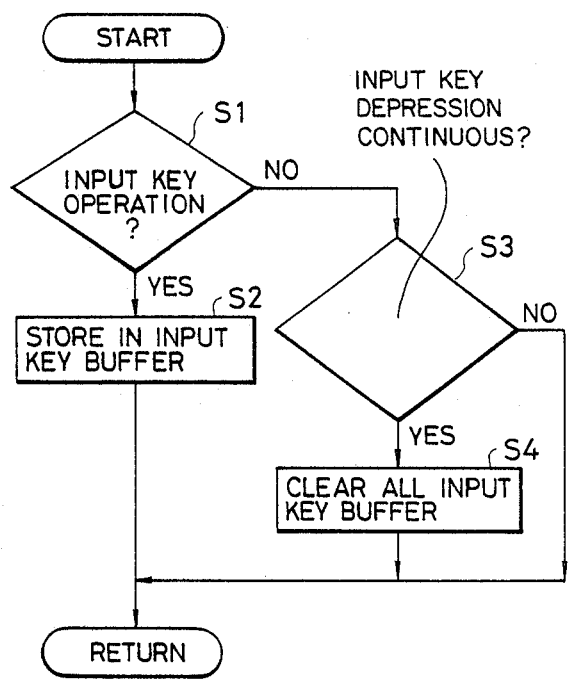
FIGS. 2a and 3 show flow charts for explaining the control operation for CPU 1 in FIG. 1.
Figure 3:
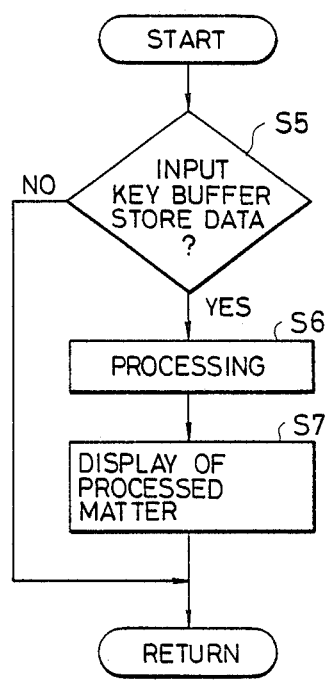

The CPU 1 contains, for example, ROMs 11 storing control programs such as the flow charts shown in FIGS. 2 and 3, RAMs 12 including text memories and storing the results of data access processes and input information code processes, and an ALU 13 executing logical judgements, arithmetic operations and the like.

Next, the operation of the embodiment constructed as above will be described in connection with FIGS. 2 and 3 showing flow charts for the control operation under the CPU 1.

In the flow chart 1, the flow of control operation is shown in which if a continuous depression of a key of the input key unit 2 is conducted, the corresponding key information codes are sequentially stored in the input key buffer 3, while in the flow chart 2, the flow of control operation is shown in which processings suitable for the stored key information codes in the input key buffer 3 are sequentially performed.

The program following the flow chart 1 proceeds at certain time intervals, and in usual cases the program following the flow chart 2 is executed.

First, upon initialization at the time the apparatus is powered, the control program following the flow chart 1 proceeds at certain time intervals to judge the presence or absence of key input (step S1). In the presence of key input, the key information code correspondingly to the key input is stored in the key input buffer 3 (step S2). Alternatively, in the absence of key input, it is judged whether one or more keys had been held continuously depressed or not. This determination is based upon whether or not all of the key codes stored in the input buffer 3 are the same or different, or alternatively stated, based upon a check of the results of key depressions (step S3). In such an instance, i.e. at the instant that it is detected that all key codes stored in the key input buffer 3 are the same, all of the contents in the key input buffer 3 are cleared (step S4).

In the flow chart 2, it is first determined if there is any key information code stored in the input key buffer 3 (step S5). Whn a key information code is present in the buffer 3, the process corresponding to the first stored key information code is carried out (step S6), e.g., when a key information code corresponding to a delete key is present, a delete process is carried out to thereafter store it in the text memories of the RAMs 12. The results are displayed on the liquid crystal display 4 (step S7). Thereafter, the above programs following the flow charts 1 and 2 are repeated.

In the above embodiment, only one CPU 1 has been used to control the programs for the flow charts 1 and 2. Independent CPUs however are also applicable for the control of the respective programs, or a hardware arrangement for performing such control is also applicable. Furthermore, although the recognition of the process results has been made on the display 4, output means 7 other than the display 4 may of course be used instead.

Further, in the above embodiment, the input key buffer 3 has been disclosed to clear at the termination of key input from continuous depression of a key. However, instead of clearing the buffer 3, the present invention may effectively be practiced by inhibiting the execution of the process for the stored data in the buffer 3.

As seen from the above description of the present invention, in the sequential processings under continuous depression of the input keys, a proper control can effectively be made such that termination of the processings at a desired position coincides with the release of continuously depressed input keys.

We claim:

1. An input apparatus comprising:
   input means for inputting information codes;
   buffer means for storing a plurality of information codes input from said input means; and
   control means for sequentially executing processing in accordance with each of the stored information codes in said buffer means and, in response to the termination of a continuous input of information codes from said input means after a predetermined period, for detecting that all of the unexecuted information codes stored in said buffer means are the same, and for immediately clearing the unexecuted information codes stored in said buffer means upon such detection, such that sequential processing of the stored unexecuted information codes is inhibited.

2. An input apparatus according to claim 1, wherein said input means is a keyboard.

3. An input apparatus according to claim 1, wherein said control means judges whether an information code has been inputted from said input means or not.

4. An input apparatus according to claim 1, further comprising display means and wherein said control means operates to perform a display on said display means.

5. An electronic typewriter comprising:
   character input means for inputting character data;
   buffer means for storing consecutive character data from said input means; and
   control means for sequentially processing the character data stored in said buffer means and for clearing said buffer means, wherein said control means is responsive to said input means and immediately clears all of the character data remaining in said buffer means when a continuous input of consecutive character data from said input means is terminated after a predetermined period, and when the character data remaining in the buffer are the same, such that sequential processing of the remaining stored character data is inhibited.

6. An electronic typewriter according to claim 5, wherein said character input means is a keyboard and said consecutive character data are produced upon continuous depression of a keyboard key.

7. An electronic typewriter according to claim 5, wherein said electronic typewriter is provided with a printer.

8. An input apparatus comprising:
   keyboard means;
   buffer means for storing at every unit time a plurality of key codes, each key code corresponding to a continuously depressed key of said keyboard means;
   output means for sequentially outputting the key codes stored in said buffer means; and
   control means for immediately clearing all of the key codes remaining in said buffer means when said continuously depressed key is released after a predetermined period and, when all of the remaining key codes stored in said buffer means are the same, such that sequential output of the remaining key codes stored in said buffer means is inhibited.

9. An input apparatus according to claim 8, wherein said input apparatus is a keyboard of an electronic typewriter.

10. An input apparatus according to claim 8, wherein said buffer means also stores the key codes for a key intermittently depressed.

11. An input apparatus comprising:
    keyboard means;
    buffer means for sequentially storing a plurality of key codes, each key code corresponding to a continuously depressed key of said keyboard means;
    output means for sequentially outputting the key codes stored in said buffer means; and
    control means for immediately clearing said buffer means, wherein said control means is responsive to said input means and clears all of the key codes remaining in said buffer means when the input of key codes for said continuously depressed key is terminated after a predetermined period, and when all of the remaining key codes are the same, such that sequential output of the remaining key codes stored in said buffer means is inhibited.

12. An input apparatus according to claim 11, wherein said control means processes in accordance with the key code outputted from said output means.

13. An input apparatus according to claim 11, wherein said input apparatus is connected to a printer and a display.

14. An input apparatus according to claim 11, wherein said input apparatus is connected to a printer.

15. An input apparatus according to claim 11, wherein said input apparatus is connected to a display.

16. Apparatus comprising:
    key means manually depressed to enter a processing code into the apparatus;
    buffer means for detecting at each predetermined interval whether or not said key means is being continuously depressed and for storing the processing code in response to each detection of the depression of said key means, the buffer means sequentially storing a plurality of processing codes; and control means for accessing said buffer means to execute a processing operation designated by an accessed one of the processing codes stored in said buffer means, each stored processing code in said buffer means being sequentially cleared upon execution, whereby the same processing is repeatedly executed during the continuous depression of said key means ovver said predetermined interval, and wherein said control means, in response to the release of the continuously depressed key means, detects whether or not all of the remaining unexecuted processing codes stored in said buffer means are the same, and immediately clears all the remaining unexecuted processing codes in said buffer means when all the remaining unexecuted processing codes are the same, such that sequential execution of the processing remaining unexecuted codes stored in said buffer means is inhibited.

* * * * *

UNITED STATES PATENT AND TRADEMARK OFFICE
CERTIFICATE OF CORRECTION

PATENT NO. : 4,804,278
DATED : February 14, 1989
INVENTOR(S) : HIDEMI GOTOU, ET AL.

It is certified that error appears in the above-identified patent and that said Letters Patent is hereby corrected as shown below:

Column 2, line 6, "2a" should read --2--;

line 59, "correspondingly" should read --corresponding--.

Column 5, line 11, "ovver" should read --over--.

Signed and Sealed this

Nineteenth Day of September, 1989

Attest:

DONALD J. QUIGG

Attesting Officer

Commissioner of Patents and Trademarks